(12) United States Patent
Nishina

(10) Patent No.: US 7,734,224 B2
(45) Date of Patent: Jun. 8, 2010

(54) IMAGE READING APPARATUS WITH A MIRROR HAVING A CURVED SURFACE TO REDUCE DEFOCUSING DURING IMAGE SCANNING

(75) Inventor: Kiichiro Nishina, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 11/808,060

(22) Filed: Jun. 6, 2007

(65) Prior Publication Data

US 2007/0279712 A1    Dec. 6, 2007

(30) Foreign Application Priority Data

Jun. 6, 2006   (JP) .............................. 2006-157645

(51) Int. Cl.
G03G 15/04    (2006.01)

(52) U.S. Cl. ..................................... 399/211

(58) Field of Classification Search ................ 399/211, 399/149; 347/256
See application file for complete search history.

(56) References Cited

U.S. PATENT DOCUMENTS 4,943,815 A  *  7/1990  Aldrich et al. .............. 347/256
5,797,070 A  *  8/1998  Waki et al. ................... 399/149

FOREIGN PATENT DOCUMENTS

| JP | 62265615 A | * | 11/1987 |
| JP | 2-111121 | | 9/1990 |
| JP | 2-308273 | | 12/1990 |
| JP | 03075719 A | * | 3/1991 |
| JP | 5-2225 | | 1/1993 |
| JP | 5-45571 | | 2/1993 |
| JP | 5-45572 | | 2/1993 |
| JP | 8-82876 | | 3/1996 |
| JP | 9-153980 | | 6/1997 |
| JP | 9-230513 | | 9/1997 |
| JP | 10-155058 | | 6/1998 |
| JP | 11-146139 | | 5/1999 |
| JP | 2000-332967 | | 11/2000 |
| JP | 2001-144899 | | 5/2001 |
| JP | 2001-183573 | | 7/2001 |
| JP | 2001-251475 | | 9/2001 |
| JP | 2002-82282 | | 3/2002 |
| JP | 2002-101263 | | 4/2002 |
| JP | 2002-244007 | | 8/2002 |
| JP | 3516491 | | 1/2004 |
| JP | 2004-109793 | | 4/2004 |
| JP | 2005-292353 | | 10/2005 |
| JP | 2006-211251 | | 8/2006 |
| JP | 2006-222917 | | 8/2006 |
| JP | 2006-323288 | | 11/2006 |

* cited by examiner

Primary Examiner—Quana M Grainger
(74) Attorney, Agent, or Firm—Dickstein Shapiro LLP

(57) ABSTRACT

An image reading apparatus includes a first running device that moves to scan a document at a predetermined speed, which includes an illumination unit and a first mirror; a second running device that moves in the scanning direction parallel to the first running device with half the predetermined speed of the first running device, which includes second and third mirrors; an imaging lens to produce an reduced image; and a line sensor to convert the reduced image to an electrical signal. At least one of the second and third mirrors is comprised of a spherical surface and a curvature radius of the spherical surface of such mirror is such that a distance deviation between the imaging lens and an imaging surface remains within usable range for actual operation regardless of movements of the first and second running devices.

8 Claims, 4 Drawing Sheets

IMAGE READING APPARATUS WITH A MIRROR HAVING A CURVED SURFACE TO REDUCE DEFOCUSING DURING IMAGE SCANNING

CROSS REFERENCE TO RELATED APPLICATION

This patent application claims priority from Japanese patent application No. 2006-157645 filed on Jun. 6, 2006 in the Japan Patent Office, the entire contents of which are hereby incorporated by reference herein.

FIELD OF THE INVENTION

This patent specification relates to an image reading apparatus, and more particularly, to an image reading apparatus with a mirror having a spherical surface with a curvature radius functional for actual operation.

BACKGROUND OF THE INVENTION

Recently, a variety of copiers including analog and digital copiers have become widely used in business. The digital copier has become more popular than the analog copier because the digital copier can handle image data more easily.

Both analog and digital copiers generally employ a document reading apparatus. The document reading apparatus used in a conventional analog copier projects a document image directly onto a surface of a photoreceptor by an optical system to obtain copies of the document image.

On the other hand, the document reading apparatus used in a conventional digital copier forms the document image on a photoelectric conversion device such as a CCD (charge coupled device) by an optical system and converts the image into an electric signal. The document image is then written on a surface of a photoreceptor by an optical system based on the electric signal.

The document reading apparatus of the conventional digital copier exposes a light on a document with a lighting system, forms an image on a line sensor with light reflected from the document, and converts image information to signals. The line sensor performs photoelectric conversion.

Such a document reading apparatus generally uses an optical system which includes three mirrors and a reduction imaging lens. The optical system includes first and second running devices to read a whole area of the document by scanning the document. The first running device includes a first mirror and an illumination system. The second running device includes second and third mirrors. The first running device scans at a scanning speed twice as fast as the second running device.

FIG. 1 is an example of the document reading apparatus. The document reading apparatus includes a contact glass 1, first and second running devices 3 and 4, a line sensor 6 and a lighting system 7. In FIG. 1, a document 2 is placed on the contact glass 1. Lmax indicates a maximum reading range of the document 2.

The document provided on the contact glass 1 is illuminated by the lighting system 7 which is provided underneath the contact glass 1. A light from the document 2 is reflected at a first mirror 3a of the first running device 3, then is reflected at second and third mirrors 4a and 4b of the second running device 4. Further, the light from the document 2 is directed into a reduction imaging lens 5 to form an image on the line sensor 6.

When the document 2 is read in a longitudinal direction, the first running device 3 and the lighting system 7 move together at a speed V toward a position of the first running device shown by 3'. The position of the first running device shown by 3' is the maximum reading range Lmax of the document 2. The second running device 4 moves at half the speed V/2 of the first running device 3 to a half moving distance of the first running device 3. The half moving distance of the first running device 3 can be referred by a position of the second running device shown by 4'. During the movements of the first and second running devices 3 and 4, the whole area of the document 2 is read.

FIGS. 2A and 2B are illustrations to explain reflection light path when the mirror has a curved surface. If the reflection mirror having a convex surface is used in the optical system of FIG. 1, the optical system has a negative power and diffuses a light beam as shown in FIG. 2A. If the reflection mirror having a concave surface is used in the optical system of FIG. 1, the optical system has a positive power and converges the light beam as shown in FIG. 2B.

If the optical system is used in the analog copier, two plane glasses each of which has a different type of mirror power may be employed so as to avoid being affected by magnification shift or to avoid resolution degradation due to length difference of light path for each image. As for the optical system used in the digital copier, width of imaging depth may be narrow in comparison to the conventional analog copier which performs same magnification imaging process because the magnification factor decreases from around 0.2 to around 0.1.

A total focal length of the mirrors and the lens may change due to a shift of positions between the mirrors and between the mirror and the lens. As a result, defocusing may occur and cause performance degradation.

BRIEF SUMMARY OF THE INVENTION

This patent specification describes a novel image reading apparatus including a first running device that moves to scan a document at a predetermined speed, which includes an illumination unit and a first mirror; a second running device that moves in the scanning direction parallel to the first running device with half the predetermined speed of the first running device, which includes a second and third mirrors; an imaging lens to produce a reduced image; and a line sensor to convert the reduced image to an electrical signal. At least one of the second and third mirrors is comprised of a spherical surface and a curvature radius of the spherical surface of such mirror is such that a distance deviation between the imaging lens and an imaging surface remains within usable range for actual operation regardless of the movements of the first and second running devices.

This patent specification further describes a novel image reading apparatus including a first running device that moves to scan a document at a predetermined speed, which includes an illumination unit and a first mirror; a second running device that moves in the scanning direction parallel to the first running device with half the predetermined speed, which includes second and third mirrors; an imaging lens to produce a reduced image; and a line sensor to convert the reduced image to an electrical signal. A maximum readable size of the document satisfies a formula, $|1/R2+1/R3|<0.002/Lmax$ where Lmax is the maximum readable size of the document, R2 is a curvature radius of the second mirror and R3 is a curvature radius of the third mirror.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
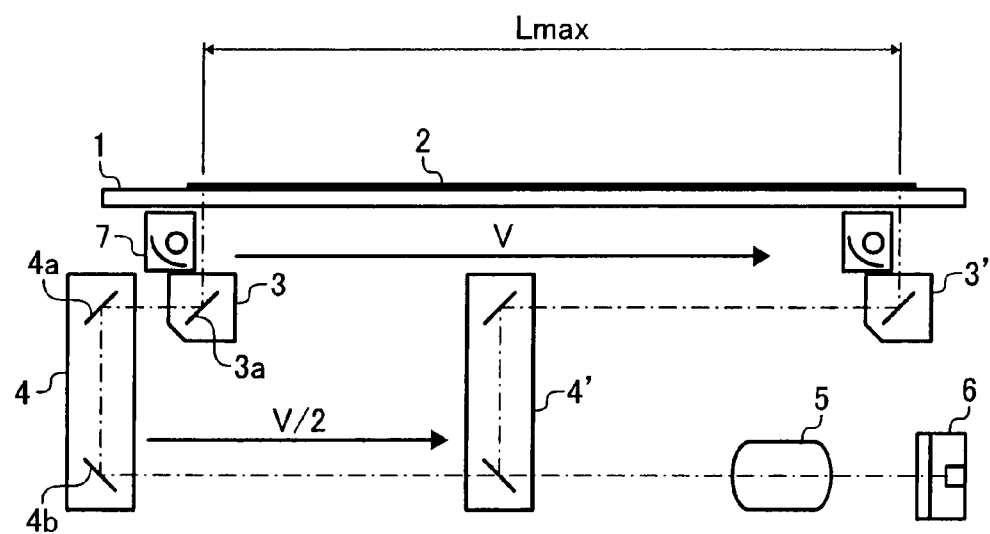
FIG. 1 is an example of a document reading apparatus.
Figure 2A:
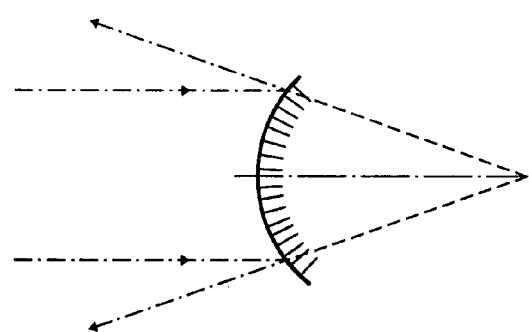
FIGS. 2A and 2B are illustrations to explain reflection light path when a mirror has a curved surface.
Figure 2B:
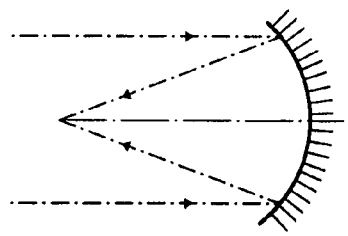

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, image reading apparatuses according to example embodiments are described.

A case in which the first and second running devices 3 and 4 move at predetermined speeds will be discussed, referring to FIG. 1.

If each of three mirrors (first, second, and third mirrors) has a curved surface, each mirror has corresponding power which is different from each other. When the first and second running devices 3 and 4 move to read a document in a longitudinal direction, distances between mirrors and the imaging lens change. As a result, a total focal length formed by the mirrors and the lens may change. A focal position at a leading portion of the document may differ from a focal position at an end portion of the document.

The leading portion of the document is defined as home position where the first running device 3 is at a position of the first running device shown by 3 in FIG. 1 and the second running device 4 is at a position of the second running device shown by 4 in FIG. 1. The end portion of the document is defined as return position where the first running device 3 is at a position of the first running device after movement shown by 3' in FIG. 1 and the second running device 4 is at a position of the second running device after movement shown by 4' in FIG. 1.

Figure 3:
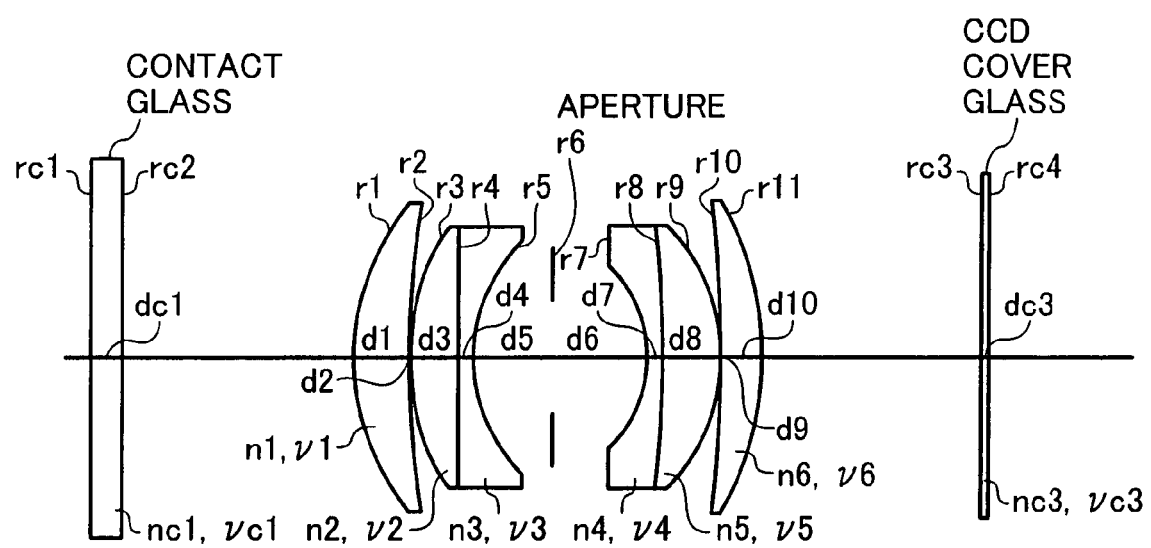
FIG. 3 is an example configuration of an imaging lens.

FIG. 3 is an example configuration of the imaging lens 5. Specifications of the imaging lens 5 are listed below.

focal length($f$)=90.27 reduction rate($m$)=0.23622

Specifications of the optical elements including the specifications of the imaging lens 5 are listed in Table 1.

TABLE 1

| | | Curvature radius: r | Distance: d | Refractive index: n |
|---|---|---|---|---|
| Contact glass | C1 | 0.0 | 3.2 | 1.51872 |
| | C2 | 0.0 | D1 | |
| first mirror | | R1 | D2 | |
| Second mirror | | R2 | D3 | |
| third mirror | | R3 | D4 | |
| Imaging lens | 1 | 29.468 | 6.91 | 1.61521 |
| | 2 | 113.824 | 0.52 | |
| | 3 | 31.071 | 5.86 | 1.48914 |
| | 4 | −5298.500 | 1.88 | 1.61639 |
| | 5 | 20.593 | 10.09 | |
| | 6 | 0.0 | 12.28 | |
| | 7 | −15.659 | 1.9 | 1.65804 |
| | 8 | −137.015 | 7.32 | 1.62033 |
| | 9 | −23.349 | 0.1 | |
| | 10 | −153.438 | 5.17 | 1.73740 |
| | 11 | −38.689 | D5 | |
| CCD cover glass | C3 | 0.0 | 1.0 | 1.51872 |
| | C4 | 0.0 | | |

Figure 4:
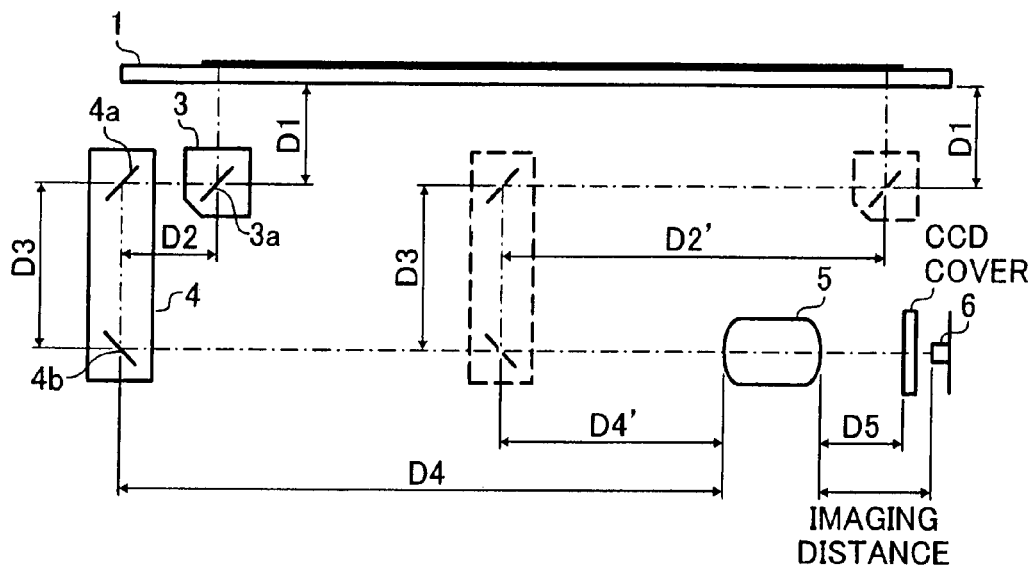
FIG. 4 is an illustration to represent positions of mirrors at both cases before and after movement of the mirrors.

FIG. 4 is an illustration to represent positions of mirrors at both cases, i.e., before and after movement of the running devices. Symbols D1 through D5, D2', and D4' represent running direction of the running device and represent each distance between ends of each line (units in millimeter).

Symbol D1 is a distance between the contact glass and the first mirror, D2 is a distance between the first mirror and the second mirror, D3 is a distance between the second mirror and the third mirror, D4 is a distance between the third mirror and the imaging lens, and D5 is a distance between the imaging lens and a cover glass for CCD. An imaging distance is a summation of D5, thickness of the cover glass, and distance between the cover glass for CCD and a light receiving surface of the CCD. The refractive index is a value for e-light (546.07 nm).

Example dimensions of D1 through D4 are listed in Table 2 using units of millimeter (mm).

TABLE 2

| | Home side position | Return side position |
|---|---|---|
| D1 | 41.50 | 41.50 |
| D2 | 33.60 | 243.60 |
| D3 | 33.60 | 33.60 |
| D4 | 318.69 | 108.69 |

As shown in FIG. 4, when the first running device 3 is at the home position, the first running device 3 is located at the closest position to the second running device 4 (D2=33.6 mm). When the first running device 3 is at the return position, the first running device 3 is located at the farthest position from the second running device 4 (D2=243.6 mm), and may be expressed by a different symbol D2'. A distance between the first mirror 3a of the first running device 3 and the imaging lens 5 can be kept to have an equal distance at both positions i.e., the home position and the return position. More specifically, the distance is a summation of D2 through D4 and the distance is 385.89 mm at both positions.

Thus, a focus is fixed with no change even when the first mirror 3a of the first running device 3 has a curved surface. As a result, defocusing does not occur regardless of the movement of the running device. The focus change due to the first mirror 3a may have been corrected during an adjusting process of the optical system.

When at least one of the mirrors on the second running device 4 has a curved surface, a distance between the mirrors and the imaging lens 5 is being changed in accordance with the movement of the running devices. A distance to an object observed from the imaging lens 5 is being changed. As a result, a distance between the imaging lens 5 and an imaging position (imaging distance) is being changed.

A focal length of mirror $f_M$ is obtained by a formula, $f_M=R_M/2$, where $R_M$ is a curvature radius of the mirror.

$R_M$ takes a positive value if the reflection surface is concave. $R_M$ takes a negative value if the reflection surface is convex. Namely, the curvature radius of the concave surface has an opposite polarity to the curvature radius of the convex surface. Similarly, the focal length of the concave surface has an opposite polarity to the focal length of the convex surface.

Generally, an optical system for scanner uses a high-precision mirror having a curvature radius larger than 200 mm. Focus shift due to the distance change between mirrors may be small because the curvature radius is larger than 100 mm.

Meanwhile, when the second running device 4 is at the home position, the second running device 4 is located at the farthest position from the imaging lens 5 (D4=318.69 mm). When the second running device 4 is moving to the return position, the second running device 4 is moving closer to the imaging lens 5 in accordance with the movement of the second running device 4. When the second running device 4 moves by a distance of 210 mm toward the return position, the second running device 4 is located at the closest position (D4=108.69 mm). A different symbol D4' may be used for convenience, if it is necessary to distinguish from original length. Due to a distance change between the second running device 4 and the imaging lens 5 having a focal length of 90 mm, defocusing may occur.

Each focal length f is expressed by $f_2=R_2/2$, $f_3=R_3/2$ respectively. The distance between the mirrors is D3 as shown in FIG. 4. Under these conditions, the focal length of the total system with two mirrors $F_M$ is obtained by a lens equation of the following formula, $$1/F_M=1/f_2+1/f_3-D3/(f_2 \times f_3) \quad (A)$$

An inverse number of the focal length is called as power P, because a refractive index is large when the inverse number of the focal length is large. D3 is a fixed number, and $f_2$ and $f_3$ are double-digit or more larger than D3. Therefore, the trinomial of formula (A) can be neglected and the inverse number of the focal length is expressed approximately by the following formula:

$$1/F_M=1/f_2+1/f_3$$

The two mirror system can be presumed to be one lens. Therefore, a total focal length F of this two mirror system is obtained similarly by using lens equation of the following formula, $$1/F=1/F_M+1/f_0-D4/(F_M \times f_0)$$

where D4 is the distance between the third mirror and the imaging lens 5.

D4 may change by a moving distance $\Delta D4$ (0.21 m in this example embodiment) of the second running device 4. Then, the power difference $\Delta P$ between the power at home position and the power at return position is expressed by the following formula:

$$\Delta P=\Delta D4/(F_M \times f_0)=\Delta D4 \times (1/f_2+1/f_3)/f_0$$

When the curvature radius is substituted into the formula, the formula becomes the following:

$$\Delta P=2 \times \Delta D4/f_0 \times (1/R_2+1/R_3) \quad (B)$$

In formula (B), $\Delta D4$ and $f_0$ are fixed values. If an image forming apparatus reads an A3 size document, the moving distance $\Delta D4$ of the second running device 4 needs to be at least half length (210 mm) of a longitudinal length (420 mm) of the A3 size document. A distance between the front side of the imaging lens 5 and the object is determined to have a marginal displacement such that the second running device 4 does not touch the imaging lens 5 when the second running device 4 has moved.

The distance S between the front side of the imaging lens 5 and the object is obtained by the following formula, $$S=(1+1/m) \times f_0$$

where $f_0$ is the focal length of the imaging lens 5, and m is a reduction rate. The reduction rate m is defined uniquely based on a reading resolution and a pitch of an image pickup device. For example, when the reading resolution is 600 dpi (dot per inch) and the pitch of an image pickup device is 10 μm, the reduction rate m is 0.23622. Further, when the pitch of the image pickup device becomes 4.7 μm, the reduction rate m is 0.11102.

The distance S between the front side of the imaging lens 5 and the object need to be kept regardless of the pitch of the image pickup device. Therefore, the focal length of the imaging lens is in a range between 0.082 m (10 μm) and 0.043 m (4.7 μm), if the distance between the front side of the imaging lens 5 and the object surface is 430 mm.

When the focal length of the imaging lens $f_0$ is 0.082 m or 0.043 m and the moving distance of the mirror $\Delta D4$ is 0.21 m in formula (B), the power difference $\Delta P$ of the total power of the mirrors and lens becomes a value between $5.122 \times (1/R_2+1/R_3)$ and $9.767 \times (1/R_2+1/R_3)$.

The value of the power difference $\Delta P$ is a variation amount to the power of the imaging lens. Therefore, the value of the power difference is now translated to a coefficient of the power. Namely, the coefficient of the $(1/R_2+1/R_3)$, i.e., 5.12 and 9.77, is divided by the power $1/f_0$ of the imaging lens. This is equivalent to multiplying the formula (B) with the focal length of the imaging lens $f_0$. Then, the power difference is rewritten as the following formula (C) by putting $2 \times \Delta D4=0.42$ as a coefficient.

$$\Delta P_g = 2 \times \Delta D4 \times (1/R_2 + 1/R_3) \quad (C)$$

$$= 0.420 \times (1/R_2 + 1/R_3)$$

The power difference $\Delta P_g$ is independent of the imaging lens as referring to formula (C). The coefficient is twice as large as the moving distance of the second running device 4 and is equal to the vertical scanning distance. Therefore, the power difference $\Delta P_g$ depends on the maximum reading range Lmax of the document (the moving distance of the first running device 3). When the document size is A3, Lmax equals 0.42 (m).

Generally, if absolute value of the power deviation is less than 0.2%, this type of imaging system works without problem during an actual operation. By inputting this condition, formula (C) becomes the following:

$$|1/R_2+1/R_3| \leq 0.002/0.420 = 0.00476$$

Further, the number is rounded, and the formula can be rewritten as the following:

$$|1/R_2+1/R_3| \leq 0.005$$

Furthermore, if the maximum reading range Lmax of the document is used, the formula is written as the following:

$$|1/R_2+1/R_3| \leq 0.002/Lmax \quad (1)$$

If the maximum reading range of the document is A2, Lmax is 0.594 (m) and the formula becomes the following:

$$|1/R_2+1/R_3| \leq 0.0034$$

When the first, second, and third mirrors have curved surfaces with the above configuration data and at the respective mirror positions, defocusing amounts are shown in Tables 3-1, 3-2, 4-1, and 4-2. As for radius of the mirror, the symbol "+" shows a concave curve and the symbol "−" shows a convex curve.

The defocusing amounts in Tables 3-1 and 3-2 are obtained by a light beam tracing method. The value of $|1/R_2+1/R_3|$ is a variation factor of the power. Based on the Tables, a relation between the value of $|1/R_2+1/R_3|$ and the defocusing amounts is obtained. A numerical example will be described at a case where Lmax is 0.42 that is for A3 document.

TABLE 3-1

|  | Combination-1 | Combination-2 | Combination-3 | Combination-4 |
|---|---|---|---|---|
| 1st-mirrorR1(m) | -200 | +200 | Plane | Plane |
| 2nd-mirrorR1(m) | +200 | +200 | +200 | +400 |
| 3rd-mirrorR1(m) | +200 | +200 | +200 | +400 |
| Defocusing amount (mm) | 0.094 | 0.094 | 0.094 | *(obscured)* |
| Value of formula (1) | 0.0100 | 0.0100 | 0.0100 | *(obscured)* |

TABLE 3-2

|  | Combination-5 | Combination-6 | Combination-7 | Combination-8 |
|---|---|---|---|---|
| 1st-mirrorR1(m) | plane | plane | Plane | Plane |
| 2nd-mirrorR1(m) | +600 | +200 | +200 | +400 |
| 3rd-mirrorR1(m) | +600 | +400 | +600 | +600 |
| Defocusing amount (mm) | *(obscured)* | 0.069 | 0.061 | *(obscured)* |
| Value of formula (1) | *(obscured)* | 0.0075 | 0.0067 | *(obscured)* |

TABLE 4-1

|  | Combination-9 | Combination-10 | Combination-11 | Combination-12 |
|---|---|---|---|---|
| 1st-mirrorR1(m) | plane | plane | plane | Plane |
| 2nd-mirrorR1(m) | -200 | +200 | +400 | +100 |
| 3rd-mirrorR1(m) | +200 | -200 | -400 | -400 |
| Defocusing amount (mm) | *(obscured)* | *(obscured)* | *(obscured)* | 0.062 |
| Value of formula (1) | *(obscured)* | *(obscured)* | *(obscured)* | 0.0075 |

TABLE 4-2

|  | Combination-13 | Combination-14 | Combination-15 | Combination-16 |
|---|---|---|---|---|
| 1st-mirrorR1(m) | plane | plane | plane | Plane |
| 2nd-mirrorR1(m) | +100 | +100 | +150 | +200 |
| 3rd-mirrorR1(m) | -300 | -200 | -600 | -400 |
| Defocusing amount (mm) | 0.053 | 0.037 | 0.041 | 0.018 |
| Value of formula (1) | 0.0067 | 0.0050 | 0.0050 | 0.0025 |

In this example embodiment, absolute value of the defocusing amount is controlled to be below 0.05 mm such that the defocusing amount is within an acceptable range for the actual operation.

When the second mirror has the same orientation of the curved surface as the third mirror as shown in combinations 1 through 8 of Tables 3-1 and 3-2, values of formula (1) are around 0.005 to have a condition in which the defocusing amount is equal to and below 0.05 mm. The value of formula (1) of 0.005 corresponds to around 0.002/Lmax. Under these conditions, the second and third mirrors may not have the same curvature radius value from each other and can have different curvature radius values as shown in combinations 6, 7, and 8.

Combinations 9 through 16 of Tables 4-1 and 4-2 are examples of calculation result in case where the second mirror has a different orientation of the curvature surface from the third mirror. The defocusing amount is equal to and above 0.05 mm when a value of formula (1) is above 0.005, referring to the combinations 12 and 13 in the case in which the second mirror has the same orientation of the curved surface as the third mirror.

As for the curvature radius, curvature radius values of the second and third mirrors need not be equal to each other. The defocusing amount can be equal to and below 0.05 mm by setting the value of formula (1) equal to and below 0.005 as shown in combinations 14 through 16, even if curvature radius values are different from each other (referring to values in the cells with gray pattern in Table 4-2). It is confirmed that giving a value to the formula (1) can estimate a defocusing amount needed with respect to the variation factor of power based on these calculation results. Namely, it is possible to obtain a focus usable for actual operation.

If the range of the defocusing amount needs to be small in this example optical system, the right term of the formula (1) is to be made small. For example, if the defocusing amount range must be equal to or less than 0.03 mm, the right term of formula (1) is set to be equal to or less than 0.003.

Formula (1) is obtained based on the results of experiments. However, formula (1) is expressed in the form of power. Therefore, formula (1) is separated off from the actual dimensions of lens (e.g., focal length), and the actual positions of mirrors. Therefore, formula (1) is not limited to the example embodiment and the concept of formula (1) is applicable to more general cases except the moving distance of the second running unit. Namely, formula (1) expresses a general idea such that the defocusing amount will be remained within a usable range for actual operation.

The mirror used in a copier, which can read an A3 size document, generally has a rectangular shape which is vertically long. The longer dimension of the mirror is along the main scanning direction which is perpendicular to a moving direction of the running devices. The length of the mirror in a longitudinal direction is around 300 mm. Therefore, it is difficult to measure a curvature radius on a whole area of the mirror. For this reason, it is practical to select a certain area of the mirror as an area to be measured.

The curvature radius value of the mirror used in formula (1) can be thought to define a power value of the mirror because the formula is to find a usable range of an imaging distance variation. For this reason, it may be enough to take the curvature radius value at around center area of the mirror as the curvature radius value of the mirror. However, if the area of the mirror for taking the curvature radius value is relatively narrow, the power value may vary depending on the position. If the curvature radius value is taken from an area having one fifth of the length in a longitudinal direction, a power value may be obtained appropriately and can be used as a power value of the whole mirror.

As described in the background section, if the reflection mirror has a convex surface, the optical system has a negative power. If the reflection mirror has a concave surface, the optical system has a positive power.

If the optical system is a combination of negative power and positive power and the third term of the right side of formula (A) is negligible, a total power of the second and third mirrors is relatively weak (focus length becomes longer). Then, variation of the imaging distance may be small even when the position of the mirror to the imaging lens changes.

As a result, a flexibility to combine the second mirror with the third mirror increases as the results show in Tables 4-1 and 4-2. When the curvature radius value of the second mirror has an opposite sign to the third mirror and has an equal curvature radius value to the third mirror, the defocusing amount can become nearly zero. Further, even for mirrors having relatively low performance, for example, R=100 m, 150 m, it is possible to obtain a combination that provides a defocusing amount remaining a usable range for actual operation.

Since the first and second running devices scan to read the document, the mirrors mounted on the running devices are affected by the vibration of motor transported mechanically. The vibration of the mirrors should be eliminated to form a high quality image. To solve this vibration-related problem, vibration-proof material may be provided at an opposite side of the mirror. The vibration-proof material may be glass, metal, elastic material and so on. By attaching the vibration-proof material, the mirror may be deformed and the curvature radius value of the reflection surface may be changed.

When the mirror having the vibration-proof material is used, a curvature radius of the mirror is to be defined to a total length including the vibration-proof material after attaching the vibration-proof material. As a result, variation of the imaging distance can be determined to be small including an additional factor by the vibration-proof material.

If all the mirrors and lens are formed of glass that is chemically stable and does not include materials toxic to humans, the mirrors and the lens can be used again as recycled parts. Further, there is no water pollution problem caused by waste liquid used during manufacturing. Furthermore, $CO_2$ gas can be reduced because there is no $CO_2$ gas generation process during manufacturing. Consequently, the image forming apparatus can be an earth-conscious machinery.

Figure 5:
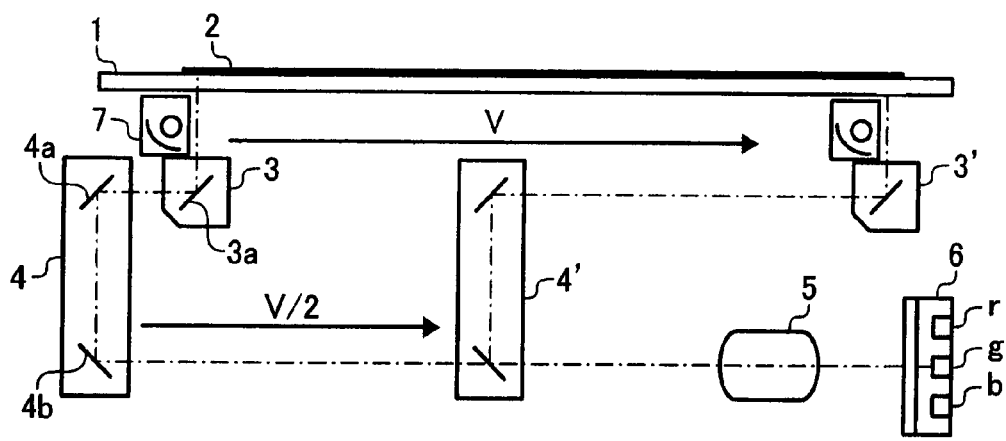
FIG. 5 is an illustration of an example configuration of a color image forming apparatus.

FIG. 5 is an illustration of an example configuration of color image forming apparatus. There are a variety of methods for color diffracting. Any method among them can be selected and applied. In an example method, prism and filters are selectively provided between the imaging lens and the CCD to diffract into r, g and b. In another example method, each light source for r, g and b is turned on sequentially to illuminate a document.

In another example method, each light-sensitive element having filter respectively for r, g and b is provided in three lines on a chip. Using so called a three line CCD, color image is formed on acceptance surface of the light-sensitive element to diffract into three primary colors.

Figure 6:
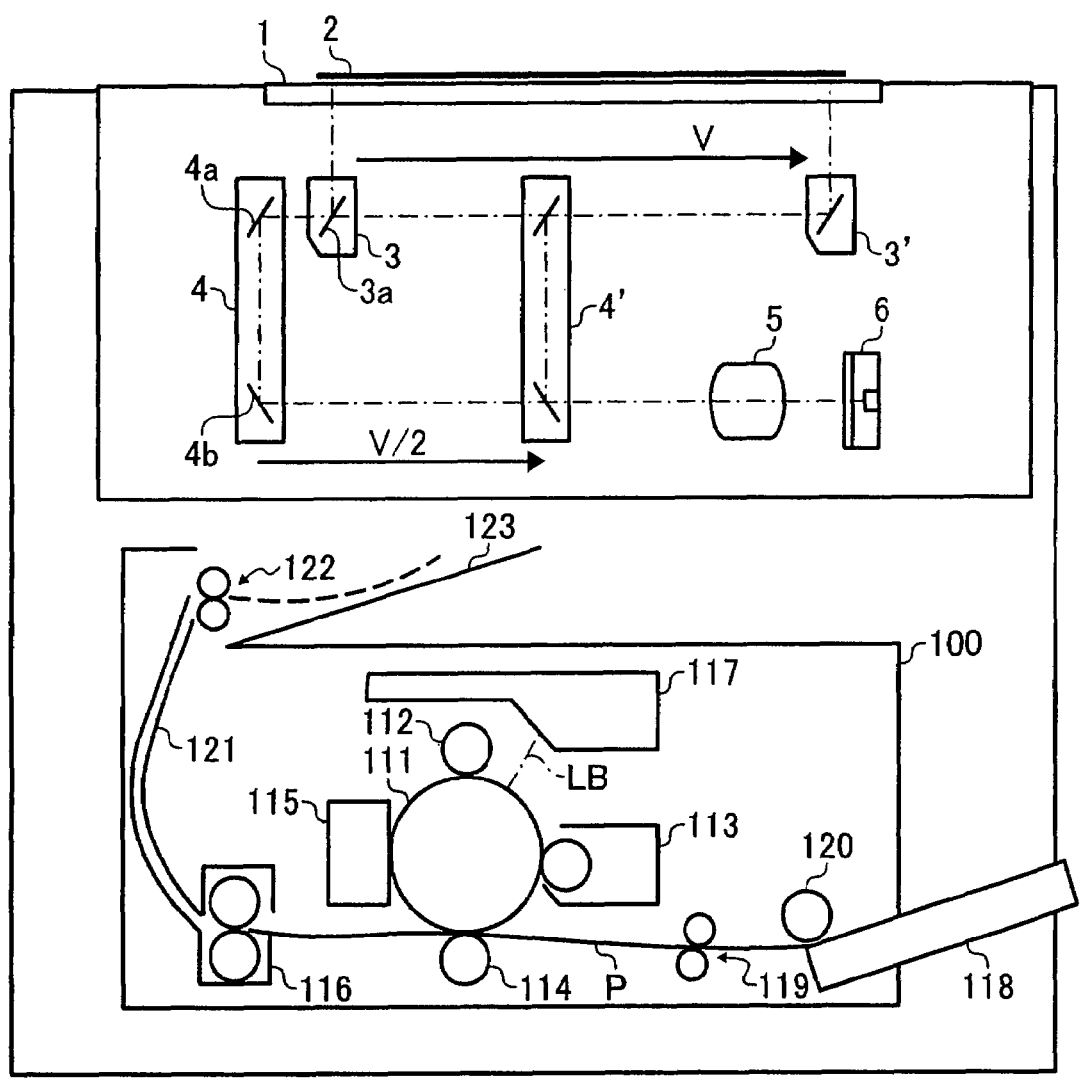
FIG. 6 is an illustration of a laser printer as an example application which employs the image reading apparatus therein.

FIG. 6 is an illustration of a laser printer 100 as an example application which installs the image reading apparatus therein. The laser printer 100 includes a latent image carrier 111, a charged roller 112, a developing device 113, a transfer roller 114, a cleaning device 115, a fixing device 116, a light scanning device 117, a cassette 118, a resist roller pair 119, a paper feed roller 120, a conveyance path 121, a paper outputting roller pair 122, a tray 123 and paper P as a recording medium.

More specifically, the laser printer 100 includes a photoreceptor as the latent image carrier 111. The latent image carrier 111 has a photo-conductivity and has a cylindrical shape. Around the latent image carrier 111, the charged roller 112 as a charging mechanism, the developing device 113, the transfer roller 114 and the cleaning device 115 are provided. A corona charger may be used as another charging mechanism. Further, the light scanning device 117 is provided between the charged roller 112 and the developing device 113 to perform light scanning by laser beam LB. Namely, the light scanning device 117 performs so called "exposure by light writing."

At image forming process, the latent image carrier 111, which is the photoreceptor having a photo-conductivity, is rotated in a clockwise direction at a predetermined constant speed. The charged roller 112 charges a surface of the latent image carrier 111 uniformly such that an electrostatic latent image is formed by the exposure of the laser beam LB from the light scanning device 117. The electrostatic latent image formed on the latent image carrier 111 is so called "negative latent image" where an image portion is exposed by the laser beam. The electrostatic latent image is developed reversely by the developing device 113 to obtain a toner image on the latent image carrier 111.

The cassette 118 which stores the paper P is detachably provided to a main body of the image forming apparatus 100. At a condition where the cassette 118 is provided, a top sheet of the paper P stored in the cassette 118 is fed by the paper feed roller 120. The resist roller pair 119 captures a front edge of the paper P. Then, the resist roller pair 119 sends the paper P to the transfer unit at an equal timing to a timing when the toner image on the latent image carrier 111 arrives to a transfer position.

The paper P is combined with the toner image at the transfer position such that the toner image is transferred electrostatically to the paper P by the transfer roller 114. The paper P is then conveyed to the fixing device 116. At the fixing device 116, the toner image is fixed. The paper P with the fixed toner image is conveyed through the conveyance path 121 and is output onto the tray 123 by the paper outputting roller pair 122.

After transferring the toner image from the latent image carrier 111, a surface of the latent image carrier 111 is cleaned by the cleaning device 115 so as to remove residual toner, particles of paper and so on. Thus, according to the present example embodiment, the latent image is formed on the latent image carrier 111 by scanning the light and is visualized so as to obtain a recorded image.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. An image reading apparatus, comprising:
a first running device configured to move to scan a document in a scanning direction with a predetermined speed and includes:
an illumination unit configured to illuminate the document at different direction from the scanning direction, and
a first mirror configured to reflect a reflected light from the document illuminated by the light from the illumination unit;
a second running device configured to move in the scanning direction parallel to the first running device with half speed of the first running device and includes:
a second mirror configured to reflect the light reflected by the first mirror, and
a third mirror configured to reflect the light reflected by the second mirror parallel to the scanning direction;
an imaging lens configured to produce a reduced image by receiving the reflected light from the third mirror; and
a line sensor configured to convert the reduced image to an electrical signal,
wherein a maximum readable size of the document satisfies a formula, $$|1/R2+1/R3|<0.002/L\max$$

where Lmax is the maximum readable size of the document, R2 is a curvature radius of the second mirror and R3 is a curvature radius of the third mirror.

2. An image reading apparatus, comprising:
a first running device configured to move to scan a document in a scanning direction at a predetermined speed and includes:
an illumination unit configured to illuminate the document from direction different from the scanning direction, and
a first mirror configured to reflect light reflected from the document illuminated by light from the illumination unit;
a second running device configured to move in the scanning direction parallel to the first running device at half the predetermined speed of the first running device and includes:
a second mirror configured to reflect the light reflected by the first mirror, and
a third mirror configured to reflect the light reflected by the second mirror parallel to the scanning direction;
an imaging lens configured to produce a reduced image by receiving the reflected light from the third mirror; and
a line sensor configured to convert the reduced image to an electrical signal, wherein at least one of the second and third mirrors comprises a curved surface, and wherein a curvature radius of the curved surface of such mirror is such that a distance deviation between the imaging lens and an imaging surface remains within a usable range for actual operation regardless of movements of the first and second running devices, and wherein curvature radii of the first mirror, second mirror, and third mirror are greater than one fifth of a length of the mirror in a longitudinal direction of the mirror.

3. An image reading apparatus, comprising:

a first running device configured to move to scan a document in a scanning direction at a predetermined speed and includes:

an illumination unit configured to illuminate the document from direction different from the scanning direction, and a first mirror configured to reflect light reflected from the document illuminated by light from the illumination unit;

a second running device configured to move in the scanning direction parallel to the first running device at half the predetermined speed of the first running device and includes:

a second mirror configured to reflect the light reflected by the first mirror, and a third mirror configured to reflect the light reflected by the second mirror parallel to the scanning direction;

an imaging lens configured to produce a reduced image by receiving the reflected light from the third mirror; and a line sensor configured to convert the reduced image to an electrical signal, wherein at least one of the second and third mirrors comprises a curved surface, and wherein a curvature radius of the curved surface of such mirror is such that a distance deviation between the imaging lens and an imaging surface remains within a usable range for actual operation regardless of movements of the first and second running devices, and wherein a polarity of the curvature radius of the second mirror is opposite from a polarity of the curvature radius of the third mirror.

4. An image reading apparatus, comprising:

a first running device configured to move to scan a document in a scanning direction at a predetermined speed and includes:

an illumination unit configured to illuminate the document from direction different from the scanning direction, and a first mirror configured to reflect light reflected from the document illuminated by light from the illumination unit;

a second running device configured to move in the scanning direction parallel to the first running device at half the predetermined speed of the first running device and includes:

a second mirror configured to reflect the light reflected by the first mirror, and a third mirror configured to reflect the light reflected by the second mirror parallel to the scanning direction;

an imaging lens configured to produce a reduced image by receiving the reflected light from the third mirror; and a line sensor configured to convert the reduced image to an electrical signal, wherein at least one of the second and third mirrors comprises a curved surface, and wherein a curvature radius of the curved surface of such mirror is such that a distance deviation between the imaging lens and an imaging surface remains within a usable range for actual operation regardless of movements of the first and second running devices, and further comprising vibration-proof material provided in the mirror to protect the mirror from vibration, wherein the curvature radius of the mirror is a total length of the mirror including the vibration-proof material.

5. The image reading apparatus of claim 2, wherein each mirror is made of glass material and the glass material does not include materials toxic to humans.

6. The image reading apparatus of claim 5, wherein the materials toxic to humans include tin or phosphorus.

7. The image reading apparatus of claim 2, further comprising a color separation mechanism provided at a position between the document surface and the imaging surface in a light path of an optical system to read document information containing full color image.

8. An image forming apparatus that employs the image reading apparatus of claim 2.

* * * * *